Oct. 4, 1932.                    W. M. BAILEY                    1,881,164
IMPROVED CAPACITOR
Filed Jan. 10, 1930
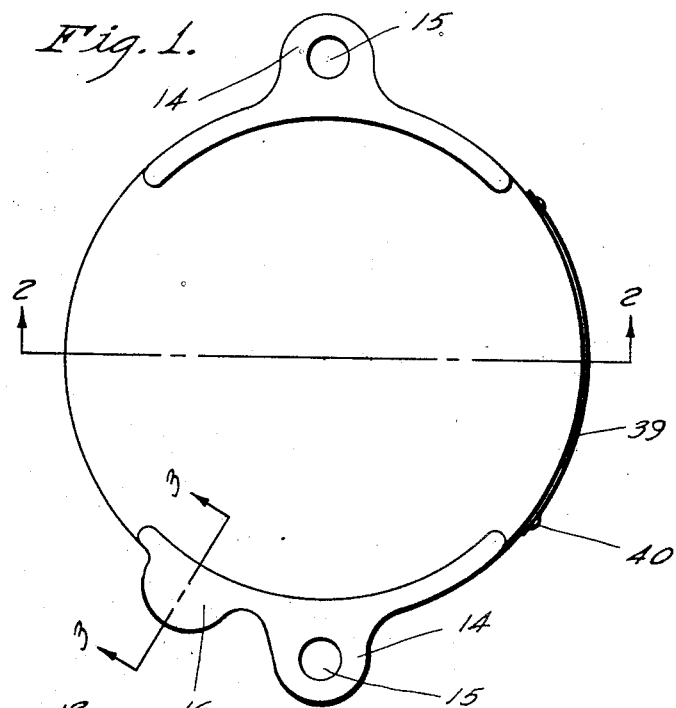
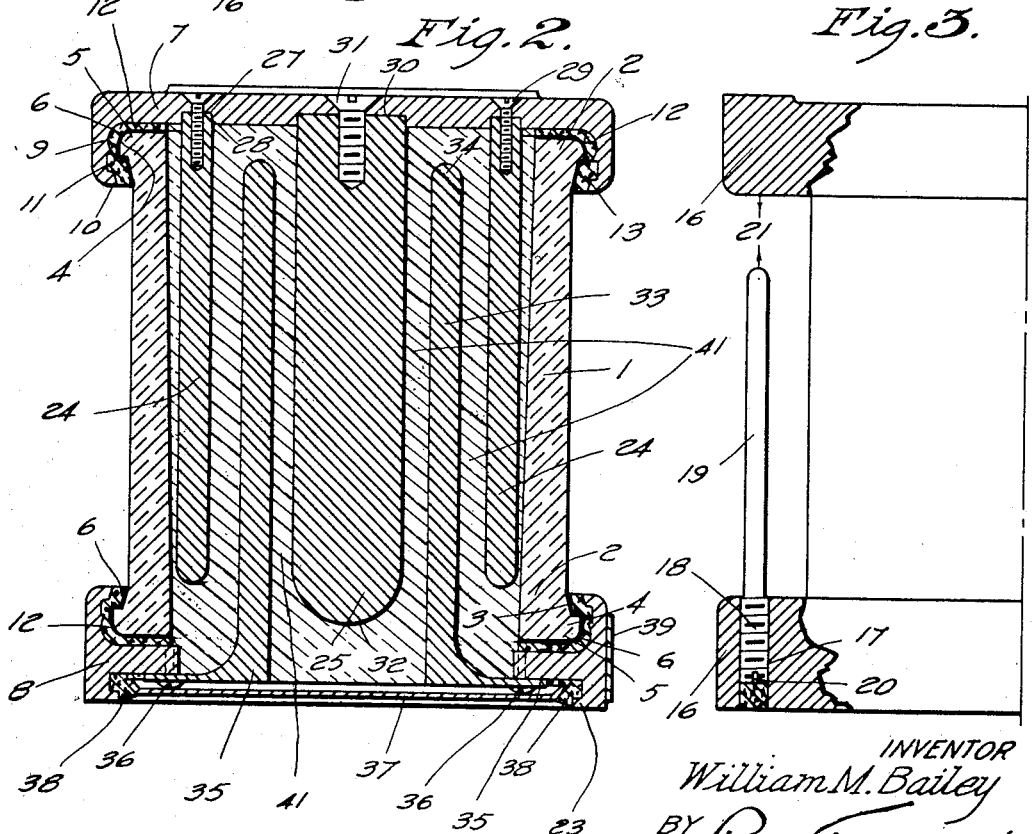
INVENTOR
William M. Bailey
BY
Philip Farnsworth
ATTORNEY Patented Oct. 4, 1932

1,881,164

UNITED STATES PATENT OFFICE

WILLIAM M. BAILEY, OF LYNN, MASSACHUSETTS, ASSIGNOR, BY MESNE ASSIGNMENTS, TO GENERAL ELECTRIC COMPANY, A CORPORATION OF NEW YORK

IMPROVED CAPACITOR

Application filed January 10, 1930. Serial No. 419,805.

This invention relates to capacitors, and more particularly to an improved low capacity device intended for use in high potential, heavy current circuits operated at high frequencies.

In the manufacture and installation of low capacity capacitors adapted for use in high potential, heavy current high frequency circuits, it has been customary to use mica capacitors mounted in metal casings or in insulating casings. Mica capacitors, generally, are costly to manufacture, due to the necessity of exercising a very high degree of care in the preparation of the mica dielectrics and in the assembling of the stack elements, followed by suitable impregnation of the so-formed units and their insertion and embedment in the casings. With these mica constructions, there is a practical limit to the current which can be handled, which minimizes the practical utility of such capacitors. In fact, such mica capacitors are not suitable for short wave work and are restricted in their practical application to high frequency circuits of an order less than 30,000 kc. A construction which overcomes some of these difficulties is shown in the patent to William H. Priess, No. 1,558,043, of 20 October 1925. In such a device, a pair of associated armatures are provided with a suitable embedding dielectric, the outer electrode serving as the casing for the enclosed embedding dielectric and associated armature. Such devices are structurally strong, but are not adapted to be piled or stacked on each other in series relation. In addition, the large electrode surface of the casing increases the danger of spark-over, as well as being a menace to attendants.

It is an object of this invention to provide an improved low capacity capacitor for ultra high frequency, heavy duty circuits.

It is a further object of this invention to provide such an improved capacitor which is adapted for series use.

It is also an object of this invention to provide such an improved capacitor which is characterized by a novel armature and casing construction, the parts of which can be made of standard size tubing which can be readily obtained in stock, and which permits a very substantial saving in the cost of the structure without affecting its operative efficiency.

Another object of this invention is the provision of a low capacity, insulating casing capacitor, adapted for heavy duty work at very high frequencies.

Still another object of this invention is the provision of an improved method for manufacturing insulation-sided, low capacity, heavy duty capacitors for ultra high-frequency work.

These and other desirable objects and advantages of the present invention will be described in the accompanying specification and illustrated in the drawing, a certain preferred embodiment being shown, by way of example only, for, since the underlying features may be incorporated in other specific constructions, it is not intended to be limited to the structure shown, except as such limitations are clearly imposed by the appended claim.

In the drawing, like numerals refer to similar parts throughout the several views, of which Fig. 1 is a top plan view of a capacitor;

Fig. 2 is a vertical section taken on line 2—2 of Fig. 1, and

Fig. 3 is a vertical section taken on line 3—3 of Fig. 1.

The embodiment of the invention here shown comprises an insulation sided casing 1, having ends 2 including tapered sections 3 and integral shouldered sections 4, having rounded edges 5. The ends 2 are provided further with a configured layer or coating 6 of a suitable metal such as lead or copper, whose function will be adverted to more in detail hereinafter. This layer or coating may be electrolytically or chemically deposited, or it may comprise a suitably configured foil member.

The casing may be made of any heat-resisting vitreous material of suitable mechanical strength and electrical resistance, such as the potash or borosilicate glasses, or any suitable ceramic or porcelain-like material may be used. Among such materials, as comprehended in this invention, are porcelain, isolantite, sillimanite, and other like inorganic structural materials. Organic structural materials, such as the well-known condensation products of phenol, phthalic anhydride, urea, and equivalent natural products, resins, and impregnated woods may also be used.

Associated with the casing in a manner to be described more in detail hereinafter, are the terminal end structures 7 and 8. Member 7 is adapted to cover an end of the casing and is provided with a depending peripheral flange 9 having an integral reentrant shouldered portion or flange 10. In addition the inner portion of member 9 is provided with a notched platform or shoulder 11. The member 7 is adapted to fit loosely over the end of the casing, the flange 10 being of slightly greater diameter than section 4 to permit the end cap to slide over the end of the casing.

The casing and the end members are joined together by means of a suitable cement inserted therebetween, and designated generally by the numeral 12. As a suitable cement, the invention comprehends the use of that type of bonding material known in the trade as Portland cement, and which is characterized by a shearing strength, when set, of 600 lbs. or more per sq. inch. Referring to Fig. 2, it will be noted that the sections 4, 10 and 11 of the casing and caps, form a series of cooperating members adapted to retain the cement 12 therebetween as an annulus 13 having shouldered portions configured to the casing and end caps. This annulus is sufficiently strong enough to withstand any applied stress tending to pull the end members away from the casing, and is, in effect, a locking ring formed in situ.

End caps 7 and 8 are formed with integral ears 14 which are provided with apertures 15 for the reception of bolts or other suitable means for mounting the capacitors in series stacks.

The end caps are also provided with another integral boss 16, which are aligned and which are adapted to serve as spark gaps. To this end, one of the bosses, 16 may be tapped, as indicated at 17, to receive the threaded end 18 of an adjustable spark-gap terminal 19. Section 18 of this terminal may be slotted at 20 to permit ready adjustment of the spark-gap indicated generally at 21. When the gap 21 has been established, a plug of cement 22 may be inserted into the remainder of the aperture 17, in order to prevent unauthorized variation of the spark-gap and thus, of the operative capacity of the capacitor, as determined by the manufacturers.

Member 8 is generally similar to member 7 in construction and operation, but is a true annulus, having an inner periphery 22 which is substantially coextensive with the inner edge of member 1, which member is supported thereon. Member 8 is provided further with a retaining flange 23, whose function will be described hereinafter.

As intimated above, one of the novel features of this invention which contributes greatly to the increased efficiency and heavy duty, high frequency current handling capacity of the capacitors embodying this invention, is to be found in the improved armatures and their mode of assembly.

Associated with end cap or terminal 7 are a pair of armatures 24, 25. Electrode 24 is a tubular member having a rounded end 26 to minimize corona effect, and a squared off end 27, fitted into an annulus 28 formed in the cap. This tubular electrode is secured to member 7 in any suitable manner, as by means of screws 29 which may be countersunk in the end cap. This construction provides a rigid support for the electrode, besides maintaining it in good electrical contact with the cap, the latter serving as a terminal. If desired, the parts may be welded, soldered or brazed together.

The electrode 25 is fitted into a depression 30 in the same end cap, and secured thereto by means of screw 31, although this connection, also, may be made by soldering, brazing or welding, without departing from the spirit and scope of the invention. Electrode 25 is provided with a rounded end 32, to minimize corona effects. This electrode has been shown as formed from a solid rod of metal of appropriate diameter, but it will, of course, be appreciated that a closed end tube may be substituted therefor, which tube could desirably be provided with cooling means, such as a water coil or direct water cooling means disposed inside the tube, and provided with suitable connections.

Cooperating with the tandem electrodes 24, 25, and disposed therebetween is an electrode 33 of tubular form having a rounded corona minimizing end 34, and an integral bottom flange 35 secured to member 8 interiorly of section 22 by screws 36, although, as above noted, the parts may be soldered, brazed or welded together. While member 33 has been shown with an integral flange 35, the latter may comprise a centrally apertured disk of suitable gauge metal to support the electrode and joined to the latter by screws, or by a screw joint, or by soldering or brazing, or autogenously as by welding.

The casing and end caps with their associated armatures having been suitably joined, the structure is inverted and heated preliminary to filling the casing and interarmature space with a suitable active dielectric, designated generally by the numeral 41. Among the materials suitable for such purposes are sulphur, halowax, syncera, paraffin wax and other like compounds, the particular material used being chosen for its dielectric properties and capacity-temperature coefficient in order to insure proper functioning under operating conditions. In addition the cost of the material enters into the calculations, as a low priced material such as paraffin wax may be suitable for low potential work, while a material such as sulphur or halowax would undoubtedly be indicated in cases where the capacitors are to be used in heavy duty circuits at high frequencies.

After the casing has been filled with the active dielectric, a dished metal cover 37 is set in position in member 8 and secured thereto by any suitable means such as solder or cement 38. A name plate 39 is secured to either end cap by screws 40.

In the operation of the improved device of the present invention, the tandem armatures 24, 25 connected to the terminal 7, in association with the opposed armature 33, permits a marked increase in the current carrying capacity of the capacitor, especially at the higher frequencies exceeding 30,000 kc., as the division of the current symmetrically with respect to the electrodes and the large current carrying surfaces exposed divides the current, thus preventing any excessive generation of heat at a given portion of the dielectric, in addition to increasing the capacity of the device. Due to the protective metallic coatings 6, the ends of the casing are maintained at a uniform potential and thus prevented from cracking under high potentials.

The construction shown, in its improved combination, is much more efficient than mica capacitors intended for the same uses, as its initial cost is very much less, while the electrical efficiency is considerably greater due to its ability to handle more KVA with less loss than other types of capacitors. This condition is due principally to the reduction of eddy current losses by the novel construction and association of the several parts, which is in contra-distinction to the above mentioned prior art devices, and more particularly equivalent devices formed with mica and foil, which are notoriously affected by eddy current losses, as is evidenced by the wide variety of cooling devices, associated with such capacitors to permit them to function in heavy duty circuits.

The terminal members and the armatures may be made of any suitable metal, preferably diamagnetic, such as aluminum, copper, brass, bronze and other like materials, although ferrous alloys may be used if magnetic effects are not of such a character as to be disturbing in a given installation. Where it is desired to use sulphur as a dielectric embedment, the metal parts, if made of copper or its alloys, are preferably provided with a protective coating of nickel or other metal which is not readily attacked by the sulphur. Such a coating may be electrodeposited on the several members, or otherwise applied according to known methods. Where aluminum is used, or nickel-copper alloys of the type known as Monel metal, no protective coating will be necessary.

It will now be appreciated that there has been provided a novel capacitor assembly adapted for heavy duty high frequency circuits characterized by high KVA handling capacity with low loss and in which the several parts are so constituted and arranged as to minimize eddy currents, and heat losses generally, as well as protecting the insulating casing from electrostatic stresses. It will be further appreciated that due to the novel method of assembling the improved capacitor, savings in material and manufacturing costs are permitted which are of appreciable magnitude and which do not detract from, but rather enhance the value of the capacitor, as its electrical and mechanical efficiency is higher than structures hitherto used for similar purposes, and further due to the monolithic construction provided by the use of sulphur or equivalent material as a combined embedding and dielectric material, the capacitor assembly is less subject to shocks received during shipment and handling, and the armatures are maintained rigid under all conditions, thus preventing buckling with consequent derangement of capacity values and possible shortening of the device.

I claim:

A high voltage high current capacitor comprising a casing of structural insulating material, rigid metal end-plates secured to a casing at opposite ends, a rigid metal armature member mechanically and thermally rigidly secured to each end-plate, and a plastic dielectric between said armatures, the separation of said armatures through said dielectric being much smaller than the separation of the end-plates by the casing, and each armature being separated from its opposite potential end-plate by said plastic dielectric.

In testimony whereof I hereunto affix my signature.

WILLIAM M. BAILEY.